Aug. 10, 1965     C. C. VEALE     3,199,373
INTERMITTENT DRIVE
Filed Sept. 5, 1962     2 Sheets-Sheet 1
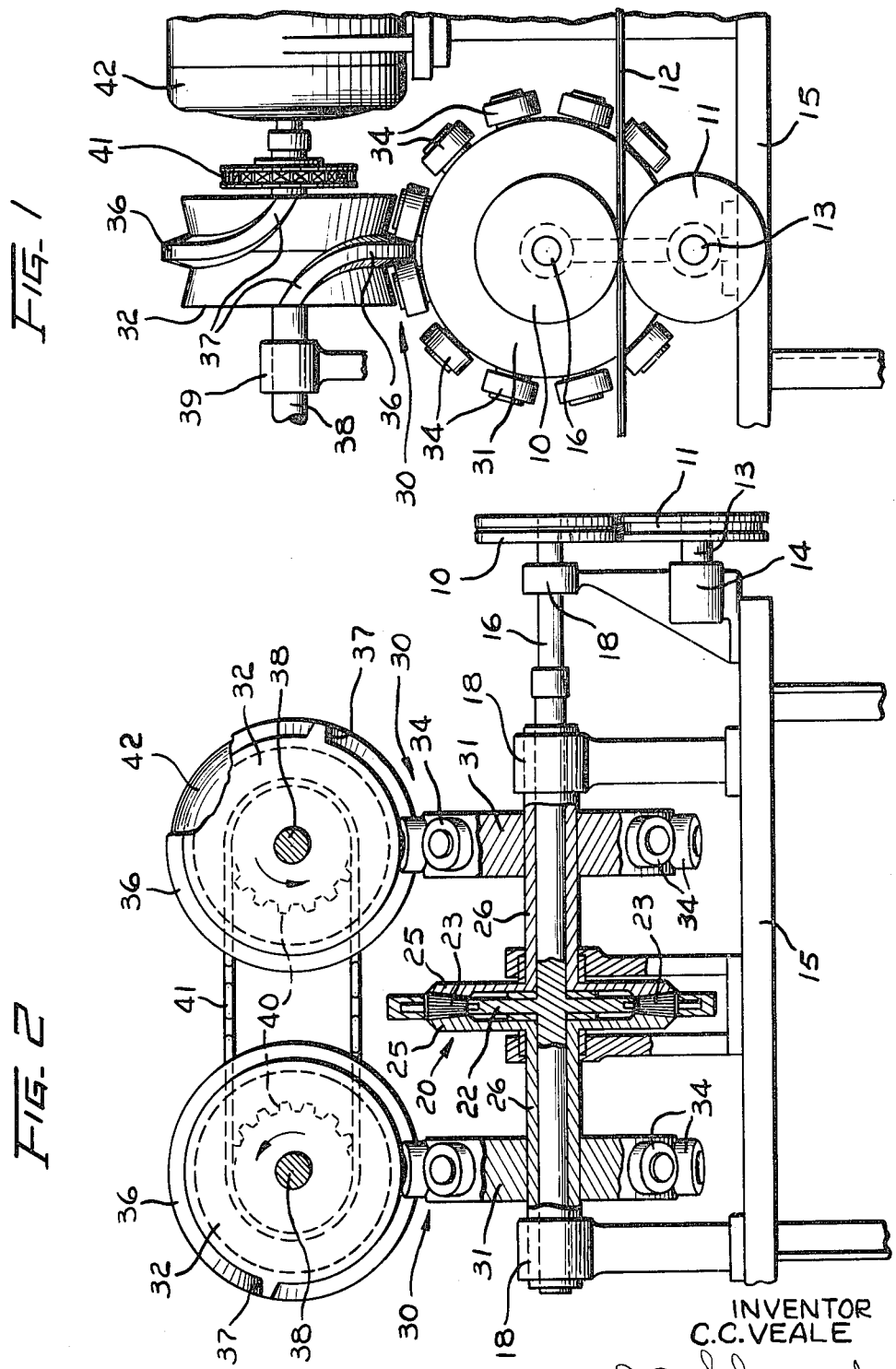
INVENTOR
C.C. VEALE
BY *A.C. Schwarz Jr.*
ATTORNEY

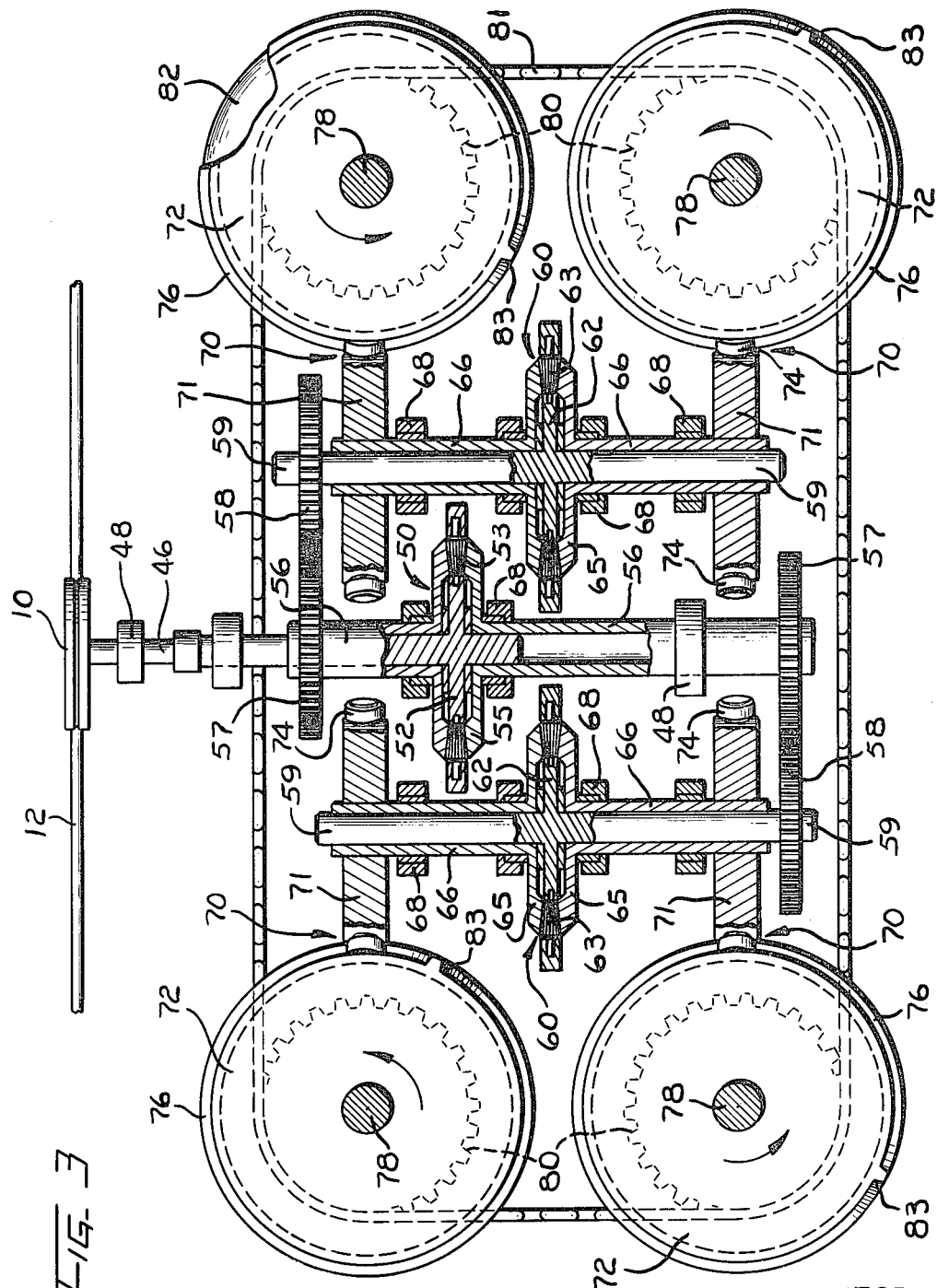

United States Patent Office 3,199,373
Patented Aug. 10, 1965

3,199,373
INTERMITTENT DRIVE
Charles C. Veale, West Chicago, Ill., assignor to Western Electric Company, Incorporated, New York, N.Y., a corporation of New York
Filed Sept. 5, 1962, Ser. No. 221,490
2 Claims. (Cl. 74—679)

This invention relates to an intermittent drive for advancing an article step by step, and more particularly to a mechanism for imparting step by step rotary movement to a driving element.

An object of the invention is to provide a mechanism for advancing an article step by step and through a relatively short distance and at relatively high frequency.

Another object of the invention is to provide an intermittent drive for imparting successive increments of movement to a rotary element.

An intermittent drive illustrating certain aspects of one embodiment of the invention as applied to a mechanism for feeding an elongated article step by step through relatively short distances at a relatively high frequency may include a drive shaft connected to one of a pair of feed rolls for advancing the article therebetween. The drive shaft is driven through differential gearing which includes a spider secured to the shaft and supporting a plurality of bevel planetary gears for revolving movement with the shaft and meshing with two sun gears mounted for rotation on the drive shaft.

Each of the sun gears is driven by an intermittent drive device including a driven wheel connected to the sun gear and a drive wheel having a cam for actuating the driven wheel through a portion of a revolution for each revolution of the drive wheel and during a relatively small portion of the revolution of the drive wheel. The pair of drive wheels are driven simultaneously and in a predetermined angular relation to each other to effect the alternate actuation of the driven wheels and the sun gears associated therewith in the same direction and the intermittent rotation of the drive shaft and the feed rolls through successive increments of movement with periods of dwell in-between.

In another embodiment of the invention several of the drive units are combined in a manner to increase the frequency of the step by step movements of the feed wheels and the article advanced thereby.

Other objects, advantages and novel aspects of the invention will become apparent upon consideration of the following detailed description, in conjunction with the accompanying drawings, in which:

FIG. 1 is a fragmentary front elevational view of one embodiment of an intermittent drive mechanism as applied to a pair of feed wheels for feeding an elongated article therebetween;

FIG. 2 is a side view of the mechanism shown in FIG. 1 with portions thereof shown in section; and FIG. 3 is a plan view of a modified embodiment of the intermittent drive mechanism showing portions thereof in sections.

Referring to one embodiment of the invention disclosed in FIGS. 1 and 2, the intermittent drive is shown connected to a pair of feed wheels 10 and 11 for advancing a pair of superposed tapes 12 step by step through relatively short distances and at a relatively high frequency. Between successive movements of the feed rolls, periods of dwell are provided of sufficient duration to permit the welding of the tapes to each other by pulses of electric current supplied thereto through the feed rolls by an electronic welding device (not shown). As illustrated in FIG. 2, the lower roll is mounted on a shaft 13 supported in and urged upwardly by a member 14 on a horizontal frame plate 15. The upper feed roll 10 is secured to a shaft 16 which is supported for rotation directly and indirectly in a plurality of bearings 18.

Rotation is imparted to the shaft 16 through a differential gear device 20 having a spider member 22 which is fixedly secured to the shaft and carries a plurality of bevel planetary gears 23 for revolving movement with the shaft 16 and for rotation about axes radial to the axis of the shaft 16. The planetary gears 23 mesh with a pair of bevel sun gears 25 mounted rotatably on the shaft 16 on opposite sides of the spider 22 and having elongated tubular hubs 26 supported on the drive shaft 16 and in the bearings 18.

Each of the sun gears 25 is driven by an intermittent drive device 30 including a driven wheel 31 and a drive wheel 32. Each of the driven wheels 31 is secured to a hub 26 of a sun gear 25 and has a plurality of circumferentially spaced cam followers 34 rotatably mounted on the periphery thereof for cooperation with a cam track 36 on the drive wheel 32. The drive wheels 32 are secured to shafts 38 that are supported in suitable bearing brackets 39 (FIG. 1) and are interconnected by sprockets 40 and a chain 41 for rotation together in the same direction. One of the shafts 38 is driven by a motor 42 (FIG. 1).

The cam track 36 on each drive wheel 32 is shaped to engage successive cam followers 34 and impart a predetermined increment of angular movement to the driven wheel corresponding to the spacing of the cam followers for each revolution of the drive wheel and during a relatively small portion of the rotation thereof. In the embodiment shown in FIGS. 1 and 2 each cam track 36 has an intermediate annular ring-like portion extending circumferentially along the periphery of the drive wheel through an arc of approximately 270° and has obliquely disposed end portions 37 extending through an arc of approximately 90°. Thus, turning movement of the driven wheel 31 is imparted thereto during approximately 90° of rotation of the drive wheel 32 and is followed by an interval of dwell during the remaining 270° of rotation of the drive wheel 32. The drive wheels 32 are arranged with the end portions 37 of the cam tracks offset angularly 180° with respect to each other so that they actuate the driven wheels 31 alternately and provide intervals of dwell therebetween.

The arrangement of the components of the drive is such that while one driven wheel 31 and its associated sun gear 25 are held against rotation, the other driven wheel 31 and its associated sun gear 25 are actuated by the drive wheel 32 through an increment of rotation in one direction, thereby causing the bevel planetary gears 23 to be rotated about their axes by the sun gear 25. The rotation of the planetary gears 23 by the moving sun gear 25 causes the planetary gears to roll along the stationary sun gear 25 and impart rotary movement to the member 22, the drive shaft 16, and the feed wheel 10, resulting in an increment of forward movement of the tapes 12. The increment of movement is followed by an interval of dwell substantially equal in time to that of the interval of movement, after which the other driven wheel 31 is actuated by its drive wheel 32, while the first driven wheel 31 is held stationary, to effect the imparting of another increment of movement to the drive shaft 16 and the tapes 12.

With the above-described mechanism, it will be apparent that successive movements through a relatively short distance and at a relatively high frequency may be imparted to the tapes 12, each movement being followed by an interval of dwell during which work may be performed on the tapes.

In another embodiment of the invention as illustrated in FIG. 3, the feed roll 10 of the pair of feed rolls for advancing the tape 12 is secured to a drive shaft 46 which is suitably supported directly or indirectly in bearings 48. The drive shaft 46 is driven through a differential gear device 50 which includes a spider member 52 fixedly secured to the drive shaft 46 and having a plurality of bevel planetary gears 53 rotatably mounted thereon in meshing engagement with a pair of sun gears 55. Each of the sun gears 55 has an elongated tubular hub 56 to which is secured a gear 57 that meshes with a gear 58 secured to a shaft 59.

Each of the two shafts 59 in turn is driven through a differential gear device 60 having a spider member 62 secured to the shaft 59 and carrying a plurality of bevel planetary gears 63. A pair of bevel sun gears 65 mesh with the planetary gears 63 and have elongated tubular hubs 66 rotatably supported on the shafts 59 and in bearings 68. Each of the four sun gears 65 is driven by an intermittent drive device 70 including a driven wheel 71 and a driver wheel 72.

The driven wheel 71 is fixed to the hub 66 of the sun gear 65 and has a plurality of cam followers 74 rotatably mounted in spaced relation to each other on the periphery of the wheel for cooperation with a cam track 76 on the driving wheel 72. Each of the driving wheels 72 is secured to a shaft 78, the shafts being mounted in suitable bearings in parallel relation to each other and interconnected by sprockets 80 and a chain 81 for simultaneous rotation in the same direction. Rotation is imparted to the shafts 78 by a motor 82 connected to one of them.

The drive wheels 72 are similar to the drive wheels 32 and each has a cam track 76 provided with an intermediate annular ring-like portion extending through an arc of approximately 315°. The cam track 76 is also provided with obliquely disposed end portions 83 extending through an arc of approximately 45° and adapted to engage successive cam followers 74 and impart increments of rotary movement to the driving wheel 71. The increment of turning movement of the driven wheel 71 is thus imparted thereto during the turning movement of the driver wheel 72 through approximately 45°. As shown in FIG. 3, the driver wheels 72 are arranged with the obliquely disposed end portions 83 in a predetermined offset angular relationship to one another so as to impart rotation to the associated driven wheels 71 in sequence.

Thus, in response to one complete revolution simultaneously of the four drive wheels 72, the driven wheels 71 and the associated sun gears 65 will be actuated in sequence through a predetermined angular increment resulting in the imparting of two increments of rotation to each of the two shafts 59. The two increments of rotation of each of the two shafts 59 are transmitted through the gears 57, 58 to the sun gears 65 of the differential gear device 50 which in turn will transmit the four increments of rotary movement to the drive shaft 46 and the feed wheel 10 in sequence and separated from one another by time intervals of dwell substantially equal to the time intervals of movement. With the drive mechanism shown in FIG. 3, the frequency of the intermittent movement is greater than that of the drive mechanism disclosed in FIGS. 1 and 2.

It will be understood that the drive mechanism is capable of being designed to provide an intermittent feed which may vary over a wide range as to the frequency of the movements, the length thereof, and the ratio of the interval of movement to the interval of dwell.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An intermittent rotary drive mechanism comprising:
    a first shaft;
    a second shaft;
    a third shaft;
    means for mounting said shafts for rotation about axes in parallel relation to each other;
    a differential gearing for each of said shafts including a member secured to the shaft for rotation therewith and having a plurality of bevel planetary gears mounted thereon for revolving movement therewith and for rotation about radial axes intersecting the axis of the shaft, and a pair of bevel sun gears rotatable on the shaft in meshing engagement with said planetary gears;
    intermittent drive devices individual to said sun gears on said second and third shafts including a rotary driven wheel operatively connected to the sun gear for rotation therewith and a rotary drive wheel having a cam for rotating the driven wheel through a portion of a revolution for each revolution of the drive wheel and during a relatively small portion of the rotation of said drive wheel;
    gearing connecting one of said sun gears on said first shaft with said second shaft for rotation together;
    gearing connecting the other sun gear on said first shaft with said third shaft for rotation together; and
    means for rotating said drive wheels simultaneously in a predetermined angular relation to each other to effect the sequential rotation of said sun gears and the intermittent rotation of said first shaft through predetermined increments of movement separated by intervals of dwell.

2. A mechanism for intermittently advancing an article comprising:
    a rotary element for effecting the advancement of the article;
    a first shaft connected to said rotary element;
    a second shaft;
    a third shaft;
    means for mounting said shafts for rotation about axes in parallel relation to each other;
    a member secured to each of the shafts for rotation therewith and having a plurality of bevel planetary gears mounted thereon for revolving movement therewith and for rotation about radial axes intersecting the axis of the shaft;
    a pair of bevel sun gears rotatable on each of the shafts in meshing engagement with said planetary gears;
    a rotary driven wheel operatively connected to each of the sun gears on said second and third shafts for rotation therewith;
    a drive wheel for each of said driven wheels having a cam for rotating the driven wheel through a portion of a revolution for each revolution of the drive wheel and during a relatively small portion of the rotation of said drive wheel;
    means interconnecting said second shaft and one of said sun gears on said first shaft for rotation together;
    means interconnecting said third shaft and the other sun gear on said first shaft for rotation together; and
    means for rotating said drive wheels simultaneously and in a predetermined angular relation to each other to effect the sequential rotation of said sun gears and the intermittent rotation of said first shaft through predetermined increments of movement separated by intervals of dwell.

References Cited by the Examiner

UNITED STATES PATENTS

| | | | |
|---|---|---|---|
| 1,194,689 | 8/16 | Wright | 74—84 |
| 3,049,017 | 8/62 | McDonald | 74—84 |

FOREIGN PATENTS 854,453  11/52  Germany.

OTHER REFERENCES

Ferguson Drives Catalogue, 7820 Maplewood Court, Maplewood, Missouri, copy in 74–84, Group 340.

DON A. WAITE, *Primary Examiner.*